(12) United States Patent
Visconti et al.

(10) Patent No.: US 6,212,851 B1
(45) Date of Patent: Apr. 10, 2001

(54) ADJUSTABLE MOLDED INNER DOOR PANEL

(75) Inventors: Carl Henry Visconti, Clarkston; Edward Joseph Wenzel, Troy, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/216,592

(22) Filed: Dec. 18, 1998

(51) Int. Cl.[7] .................................................. B62D 25/04
(52) U.S. Cl. ................. 52/784.1; 52/309.16; 296/146.1; 296/146.5
(58) Field of Search ........................... 52/309.15, 309.16, 52/573.1, 656.4, 784.1; 296/146.1, 146.5, 146.6

(56) References Cited

U.S. PATENT DOCUMENTS

| | | | |
|---|---|---|---|
| 4,450,661 | * 5/1984 | Whitener | 52/309.16 X |
| 4,945,682 | * 8/1990 | Altman et al. | 296/146.5 X |
| 5,129,204 | * 7/1992 | Palumbo | 52/573.1 X |
| 5,481,831 | * 1/1996 | Heim et al. | 296/146.6 X |
| 5,491,951 | * 2/1996 | Riegelman | 52/309.16 |

* cited by examiner

Primary Examiner—Carl D. Friedman
Assistant Examiner—Kevin D. Wilkens
(74) Attorney, Agent, or Firm—Patrick M. Griffin

(57) ABSTRACT

A molded inner door panel for an automotive vehicle having a header extending above a beltline. The inner door panel has a notched metal frame insert, and a polymeric molded frame encasing the metal frame insert within the header. Advantageously, the notches provide precise inboard and outboard adjustability of the header of the inner door panel during assembly to the vehicle. The molded inner door panel has a resilient insert, e.g., elastomeric thermoplastic, disposed between the notches of the metal frame insert and the polymeric molded frame. Additionally, the polymeric material of the polymeric molded frame is substantially thinner in the area covering the notches than in the area bordering the notches. These features prevent the polymeric material from cracking upon adjustment.

11 Claims, 1 Drawing Sheet

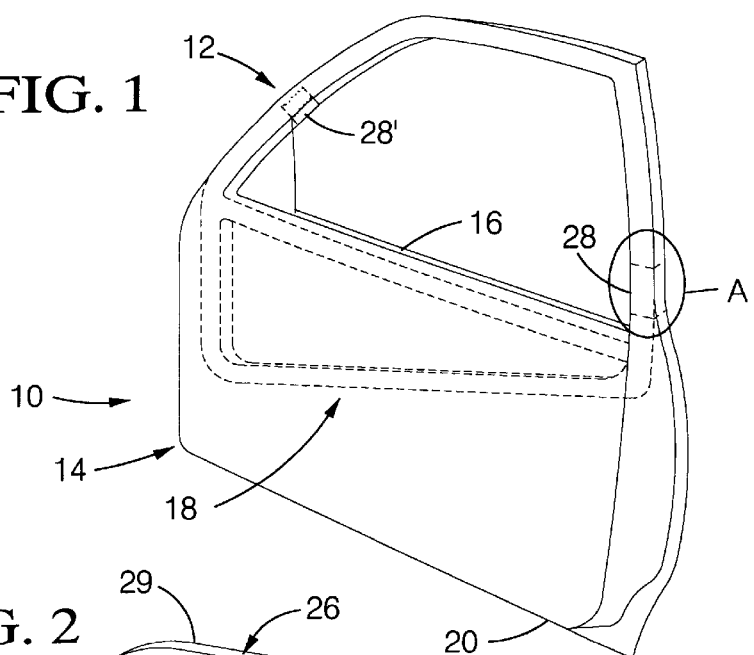
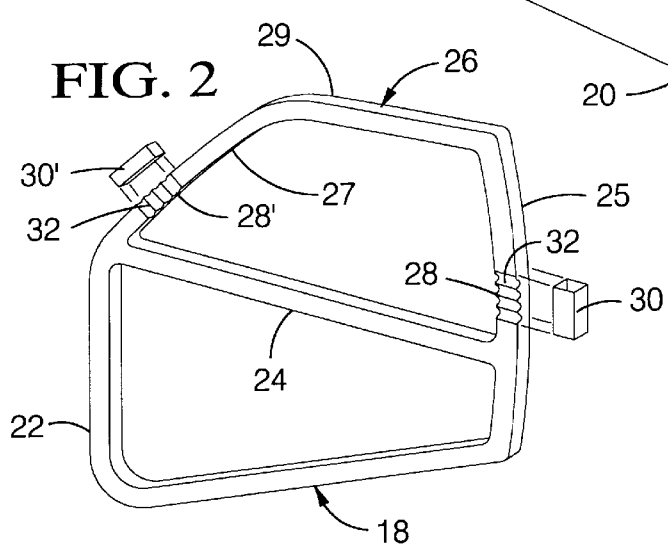
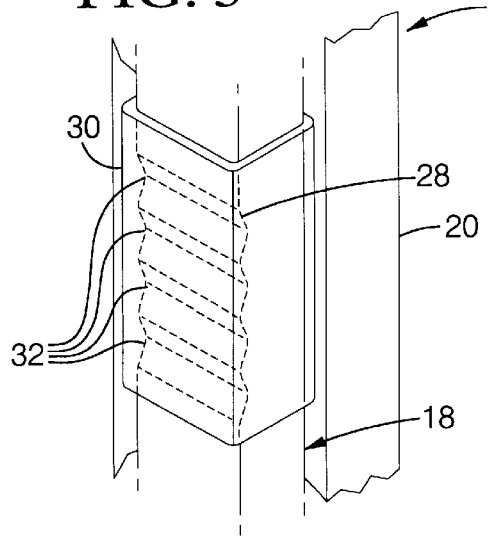
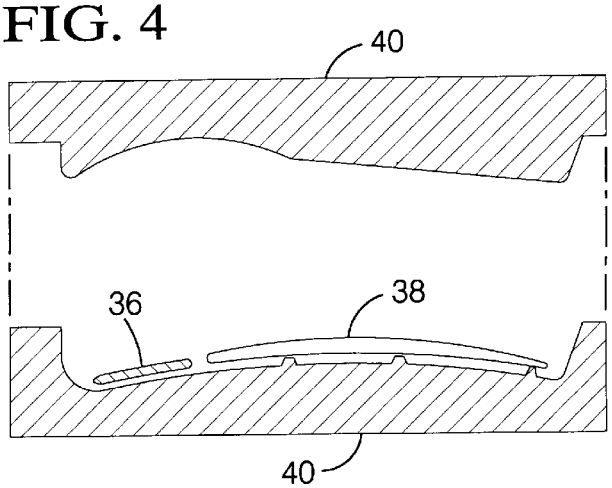

ADJUSTABLE MOLDED INNER DOOR PANEL

TECHNICAL FIELD

The present invention relates to a door for an automotive vehicle, and more particularly, to an adjustable molded inner door panel for an automotive vehicle.

BACKGROUND OF THE INVENTION

Generally, automotive doors for motor vehicles comprise a structural inner door panel, an outer panel, trim surfaces, and associated hardware, e.g., latches, window glass, regulators, switches, and speakers. The inner door panel provides structural support and mounting surfaces for the hardware. The outer panel attaches to the inner door panel to provide an aesthetic outside surface, as well as increase the rigidity of the entire door structure. The trim surfaces provide an aesthetic inside covering to the inner door panel as well as some functional features, e.g., pull cups and ashtrays.

Inner door panels are typically manufactured from various metal forming operations, e.g., stamping, roll forming, or welding. The header of the inner door panel provides the frame into which the visible window glass fits and extends upwardly from the lower boundary of the visible window glass, i.e., from the beltline. The header may be manufactured as an integral part of the door assembly comprised of a stamped metal inner panel hem bonded to a stamped metal outer panel, or as a separate piece which is joined to the lower section of the inner door panel at just below the beltline.

During production line assembly of automotive vehicles, the inner door panels must be rapidly mounted within door openings of the vehicles via hinges, e.g., one per minute. However, the dimensions of the door openings will vary due to the stacked up tolerances of the many different operations required to assemble the vehicle. Additionally, door inner panel dimensions also vary due to assembly tolerance stacking as well as paint related operations. As a result the inner door panels must be rapidly adjusted to fit each individual door opening on the assembly line.

This adjustment process is time consuming, labor intensive and imprecise. If the inner door panel must be adjusted toward the vehicle (inboard) to fit the door opening, substantial pressure is manually applied at the top of the header to force the inner door panel to bend slightly at approximately the beltline. The fit is then checked, and the adjustment process is repeated until a proper fit has been obtained. If the inner door panel must be bent away from the vehicle (outboard), the adjustment process is even more difficult.

Because of the crude nature of the above described adjustment process, modular doors cannot be mounted to the door openings of a vehicle on an assembly line without incurring a risk of damage. Therefore, inner door panels are typically mounted and adjusted first, and the other components of the automotive door are assembled further down the assembly line. This increases the amount of parts that must be stocked on the assembly line, consequently increasing the overall time and cost of manufacture of the vehicle. This also inhibits the ability to consolidate parts, and to supply a fully assembled, pre-tested modular door to an original equipment manufacturer (OEM).

Modular doors that consist of an inner door panel alternatively manufactured from a polymeric, e.g., thermoplastic, molding process are generally more precisely formed than metal inner door panels. However, the polymeric inner door panels are not adjustable. That is, the polymeric material will either snap back to its original shape, or crack, if bent to fit a door opening. As a result, the metal inner door panels are preferred over the polymeric inner door panels in spite of the fact that the metal inner door panels are difficult to adjust.

A number of the above referenced components can be pre-assembled and/or consolidated to form a modular door, which are generally pre-tested for functionality and inspected prior to assembly to the vehicle. Modular doors can range in complexity from an inner door panel with a few hardware components attached, to a fully assembled automotive door. In producing a modular door, there are parts consolidation benefits resulting in cost and weight reduction to be gained by molding the door inner panel (with associated function and trim) from polymeric materials.

SUMMARY OF THE INVENTION

This invention offers advantages and alternatives over the prior art by providing an adjustable molded polymeric, e.g., thermoplastic, inner door panel having a notched metal frame insert encased within the header.

Advantageously, the inner door panel of the present invention reduces the time, labor and cost involved in adjusting doors on an automotive assembly line by providing precise adjustment of the header at the location of the notches. Since the invention can be mounted on the door opening as an assembled modular door, less parts are required to be stocked in the assembly plant and the overall cost of manufacture is reduced. Additionally the invention provides the ability to consolidate parts and to supply an assembled, pre-tested modular door to an OEM. Also the polymeric inner door panels embodying the invention are lighter, less expensive, and more precise than metal inner door panels.

These and other advantages are accomplished in a preferred form of the invention by providing an inner door panel for an automotive vehicle having a header extending upwardly from a beltline. The inner door panel comprises a metal frame insert having notched portions located within the header, and a polymeric molded frame encasing the metal frame insert. Advantageously the notched portions provide precise inboard and outboard adjustability of the header, and the metal frame insert, aside from adding strength, prevents the polymeric material of the molded frame from snapping back after adjustment.

In an exemplary embodiment of the invention, the molded inner door panel has resilient inserts, e.g., elastomeric thermoplastic, disposed between the notched portions of the metal frame insert and the polymeric molded frame. Additionally, the polymeric material of the polymeric molded frame is substantially thinner in the area covering the notched portions than in the bordering areas. These features prevent the polymeric material from cracking upon adjustment.

Preferably, the molded inner panel advantageously comprises part of a modular door. This provides the modular door with the adjustabilty required for fitting the door to door openings on the assembly line, without incurring a substantial risk of damage.

BRIEF DESCRIPTION OF THE DRAWINGS

The present invention will now be described, by way of example only, with reference to the accompanying drawings in which:

FIG. 1 is a perspective view of an adjustable molded inner door panel embodying the present invention;

FIG. 2 is a perspective view of a metal frame insert having notched portions embodying the present invention;

FIG. 3 is an enlarged perspective view of the area of FIG. 1 around a notched portion embodying the present invention; and FIG. 4 is a sectional view of a mold used in an exemplary method of making the inner door panel of FIG. 1.

DETAILED DESCRIPTION OF THE INVENTION

Referring to FIG. 1, a perspective view of an adjustable molded inner door panel embodying the present invention is shown generally at 10. The inner door panel has a header 12 extending above a beltline 16. Header 12 generally forms an inverted U-shape that joins a lower panel section 14 of the inner door panel 10 at belt line 16. The inner door panel 10 comprises a polymeric molded frame 20 encasing a metal frame insert 18. The metal frame insert 18 forms a portion of the header 12 and lower panel section 14. Frame insert 18 has a pair of notched portions 28 and 28' located within header 12 to provide adjustability therein. Area A shows one such notched portion 28 located just above the beltline 16. By way of example only, the polymeric molded frame 20 is described herein as being constructed of thermoplastic material, however one skilled in the art will appreciate that any number of other polymeric materials may be used as well.

Referring to FIG. 2, metal frame insert 18 includes a crossbar 24 located approximately at beltline 16. Frame insert section 22 is generally trapezoidal in shape and extends downwardly from crossbar 24 to form a portion of lower section 14 of the inner door panel 10. Header insert section 26 includes vertical bars 25 and 27 which extend upwardly from the crossbar 24, and also includes horizontal bar 29 which joins to the upper distal ends of vertical bars 25 and 27 respectively. Notched portion 28 is located at the lower distal end of vertical bar 25 proximately adjacent the crossbar 24, and notched portion 28' is located intermediate vertical bar 27. Notched portions 28 and 28' include a plurality of notches 32, which run longitudinally along the width of vertical bars 25 and 27 respectively. The notches 32 have a predetermined depth to permit sufficient malleability of the notched areas 28 and 28' without significantly reducing the yield strength of the metal frame insert 18. Resilient inserts 30 and 30' are used to cover notched portions 28 and 28' respectively. Resilient inserts 30 and 30' are constructed of an elastomeric thermoplastic material that is compatible with the thermoplastic material of molded frame 20. Inserts 30 and 30' support the area around the notched portions 28 and 28' during the cooling phase of the molding process to prevent shrinkage of the polymeric material of molded frame 20, therefore providing an aesthetically consistent outer surface to frame 20. Additionally, the resiliency of inserts 30 and 30' cushion the polymeric material from the notches 32 to allow the polymeric material to flex without cracking.

Referring to FIG. 3, an exploded view of area A (shown in FIG. 1) is shown. Resilient insert 30 covers notched portion 28, and is in turn covered by a portion of molded frame 20. The thickness of the portion of molded frame 20 covering insert 30 is formed substantially thinner than the portion of molded frame 20 bordering the upper and lower distal ends of insert 30. This difference in thickness combined with the resiliency of insert 30 allows the thermoplastic material of molded frame 20 to flex within the area of notched portion 30 without cracking, and to cover the notches with an aesthetically consistent surface. Notches 32 are deep enough to provide sufficient malleability of notched portion 28 to permit precise inboard and outboard adjustability to header 12 without significantly reducing the yield strength of metal frame insert 18. Therefore, once the header 12 is adjusted, the yield strength of frame insert 18 prevents the thermoplastic material of molded frame 20 from snapping back to its original shape. It will be appreciated that area A has been described by way of example, and that this description also pertains to the portion of header 12 which includes notched portion 28' and resilient insert 30'. It will be further appreciated that any number of notched portions may be added within header 12 to provide additional adjustability where required.

In the manufacturing of inner door panel 10, the metal frame insert 18 is fabricated using a metal forming process, e.g., stamping, roll-forming and an appropriate bending and/or joining process. Notched portions 28 and 28' are formed in the portions of header insert section 26 where adjustability is required. The thermoplastic resilient inserts 30 and 30', compatible with the thermoplastic material used to mold the polymeric frame 20, are secured over the notched portions 28 and 28'. The metal frame insert 18 is inserted into a mold 40 as shown in FIG. 4. Insert molded trim pieces 36 and 38 are also loaded into the mold 40. A thermoplastic molding process, e.g., injection molding, compression molding, injection-compression molding, or extrusion deposit compression molding, forms the complete inner door panel 10. The mold is designed such that only a very thin layer of thermoplastic material will be molded in the areas covering notched portions 28 and 28'. The mold 40 is closed and heat is applied for a predetermined period of time to form the molten thermoplastic of molded frame 20, and to cause adhesion to the trim pieces 36 and 38 and adhesion/encapsulation of the metal frame 18.

It will be understood that a person skilled in the art may make modifications to the preferred embodiment shown herein within the scope and intent of the claims. While the present invention has been described as carried out in a specific embodiment thereof, it is not intended to be limited thereby, but is intended to cover the invention broadly within the scope and spirit of the claims.

What is claimed is:

1. An inner door panel for a vehicle having a header extending upwardly from a beltline, said inner door panel comprising:

a metal frame insert having a notched portion, said notched portion located within said header;

a polymeric molded frame encasing said metal frame insert; and a resilient insert disposed between said notched portion and said polymeric molded frame.

2. The inner door panel as in claim 1, wherein said inner door panel is configured for use with a modular door.

3. The inner door panel as in claim 1, wherein said notched portion further comprises a first and second notched portion.

4. The inner door panel as in claim 1, wherein said notched portion is a plurality of notches.

5. The inner door panel as in claim 1, wherein said polymeric molded frame is formed of a thermoplastic material.

6. The inner door panel claim 1, wherein said resilient insert is formed of a thermoplastic material.

7. An inner door panel for a vehicle having a header extending upwardly from a beltline, said inner door panel comprising:
- a metal frame insert having a notched portion, said notched portion located within said header;
- a polymeric molded frame encasing said metal frame insert, said polymeric molded frame including a first area substantially covering said notched portion, said first area having a first polymeric material thickness; and
- a second area bordering said first area, said second area having a second polymeric material thickness that is substantially greater than said first polymeric material thickness.

8. An inner door panel for a vehicle having a header extending upwardly from a beltline, said inner door panel comprising:
- a metal frame insert having a first notched portion and a second notched portion, said first notched portion and said second notched portion being located within said header;
- a polymeric molded frame encasing said metal frame insert;
- a first vertical member extending upwardly from said beltline and having a first upper distal end, said first vertical member having said first notched portion located between said beltline and said first upper distal end;
- a second vertical member extending upwardly from said beltline and having a second upper distal end, said second vertical member having said second notched portion located between said beltline and said second upper distal end; and
- a horizontal member attached to said first and second upper distal ends.

9. An inner door panel for a vehicle door, comprising:
- a) a metal frame insert having a header portion, said header portion having a pair of adjustment areas being configured, dimensioned and positioned to allow said metal frame insert to be adjusted;
- b) a pair of resilient members being configured and dimensioned to cover said pair of adjustment areas; and
- c) a polymeric molded frame encasing said metal frame insert.

10. An inner door panel as in claim 9, wherein said vehicle door is modular door.

11. An inner door panel has in claim 9, wherein said pair of adjustment areas include a plurality of notches disposed on said metal frame.

* * * * *